(12) United States Patent
Yang et al.

(10) Patent No.: US 12,468,188 B2
(45) Date of Patent: *Nov. 11, 2025

(54) REFLECTIVE MEMBER AND REFLECTION MODULE INCLUDING REFLECTIVE MEMBER

(71) Applicant: Samsung Electro-Mechanics Co., Ltd., Suwon-si (KR)

(72) Inventors: So Mi Yang, Suwon-si (KR); Jin Se Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,882

(22) Filed: Mar. 6, 2024

(65) Prior Publication Data

US 2024/0210662 A1 Jun. 27, 2024

Related U.S. Application Data

(63) Continuation of application No. 17/183,614, filed on Feb. 24, 2021, now Pat. No. 11,953,660.

(30) Foreign Application Priority Data

Sep. 16, 2020 (KR) .................. 10-2020-0119203

(51) Int. Cl.
*G02F 1/1335* (2006.01)
*G02B 5/00* (2006.01)
(Continued)

(52) U.S. Cl.
CPC ....... *G02F 1/133526* (2013.01); *G02B 5/003* (2013.01); *G02B 5/08* (2013.01); *G02B 13/0065* (2013.01)

(58) Field of Classification Search
None
See application file for complete search history.

(56) References Cited

U.S. PATENT DOCUMENTS 11,363,176 B2 * 6/2022 Jung ..................... H04N 23/51
11,953,660 B2 * 4/2024 Yang ................. G02F 1/133526
(Continued)

FOREIGN PATENT DOCUMENTS

CN 101995568 A 3/2011
CN 102621698 A 8/2012
(Continued)

OTHER PUBLICATIONS

Chinese Office Action Issued on Mar. 21, 2024, in counterpart Chinese Patent Application No. 202110783432.4 (5 pages in English (partial English translation), 11 pages in Chinese).
(Continued)

*Primary Examiner* — Dung T Nguyen
(74) *Attorney, Agent, or Firm* — NSIP Law

(57) ABSTRACT

A reflective member includes an incident surface configured to receive incident light; a reflective surface configured to receive the incident light from the incident surface and reflect the incident light; an emission surface configured to receive the reflected light from the reflective surface and emit the reflected light; and a light blocking portion disposed on at least one edge of either one or both of the incident surface and the emission surface, wherein an end of the light blocking portion includes a plurality of convex portions and a plurality of concave portions.

11 Claims, 13 Drawing Sheets

(51) Int. Cl.
    *G02B 5/08*    (2006.01)
    *G02B 13/00*   (2006.01)

(56) References Cited

U.S. PATENT DOCUMENTS

| | | |
|---|---|---|
| 2011/0188121 A1 | 8/2011 | Göring et al. |
| 2016/0091643 A1 | 3/2016 | Arayama et al. |
| 2016/0238848 A1 | 8/2016 | Sugihara et al. |
| 2018/0081149 A1 | 3/2018 | Bae et al. |
| 2019/0049702 A1 | 2/2019 | Chou |
| 2019/0243120 A1 | 8/2019 | Lin |
| 2021/0048649 A1* | 2/2021 | Goldenberg ....... G02B 13/0065 |

FOREIGN PATENT DOCUMENTS

| | | |
|---|---|---|
| CN | 109564337 A | 4/2019 |
| JP | H8-50251 A | 2/1996 |
| JP | H8-297240 A | 11/1996 |
| JP | 2003-16432 A | 1/2003 |
| JP | 2007-133096 A | 5/2007 |
| JP | 2007-328190 A | 12/2007 |
| JP | 5476354 B2 | 4/2014 |
| KR | 10-1742501 B1 | 6/2017 |
| TW | 201510026 A | 3/2015 |
| TW | 201935124 A | 9/2019 |

OTHER PUBLICATIONS

Korean Office Action issued on Mar. 2, 2022, in counterpart Korean Patent Application No. 10-2020-0119203 (8 pages in English, 5 pages in Korean).

Taiwanese Office Action issued on Jun. 6, 2022, in counterpart Taiwanese Patent Application No. 110107727 (8 pages in English, 7 pages in Chinese).

Korean Office Action issued on Sep. 2, 2022, in counterpart Korean Patent Application No. 10-2020-0119203 (8 pages in English, 6 pages in Korean).

Taiwanese Office Action issue on Feb. 5, 2024, in counterpart Taiwanese Patent Application No. 112139229 (6 pages in English, 7 pages in Chinese).

U.S. Appl. No. 17/183,614, filed Feb. 24, 2021, So Mi Yang et al., Samsung Electro-Mechanics Co., Ltd.

Korean Office Action issued on Oct. 18, 2024, in counterpart Korean Patent Application No. 10-2023-0069219 (7 pages in English, 5 pages in Korean).

\* cited by examiner

REFLECTIVE MEMBER AND REFLECTION MODULE INCLUDING REFLECTIVE MEMBER

CROSS-REFERENCE TO RELATED APPLICATIONS

This application is a continuation of application Ser. No. 17/183,614 filed on Feb. 24, 2021, now U.S. Pat. No. 11,953,660 issued on Apr. 9, 2024, and claims the benefit under 35 USC 119(a) of Korean Patent Application No. 10-2020-0119203 filed on Sep. 16, 2020, in the Korean Intellectual Property Office, the entire disclosures of which are incorporated herein by reference for all purposes.

BACKGROUND

1. Field

This application relates to a reflective member and a reflection module including a reflective member.

2. Description of Related Art

Camera modules have become a standard feature of portable electronic devices including smartphones. The thickness of portable electronic devices has been decreasing, thereby necessitating a decrease in the size of camera modules.

On the other hand, the performance of camera modules has been increasing by adding functions such as autofocusing and optical image stabilization, which has limited a decrease in the size of the camera modules.

Even though smaller camera modules are needed, it is difficult to reduce the size of the camera modules, which has limited a decrease in the thickness of portable electronic devices including the camera modules.

To solve such a problem, a camera module having a plurality of lenses and a reflective member for changing a path of light disposed in a length direction or a width direction of a portable electronic device, rather than in a thickness direction of the portable electronic device, has been developed.

Such a camera module has a structure that is different from a structure of a conventional camera module, such as having a reflective member and a longer total track length, which may cause an image quality to deteriorate due to a flare phenomenon that does not occur in the conventional camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a reflective member includes an incident surface configured to receive incident light; a reflective surface configured to receive the incident light from the incident surface and reflect the incident light; an emission surface configured to receive the reflected light from the reflective surface and emit the reflected light; and a light blocking portion disposed on at least one edge of either one or both of the incident surface and the emission surface, wherein an end of the light blocking portion includes a plurality of convex portions and a plurality of concave portions.

The convex portions and the concave portions may be alternately and repeatedly disposed.

The end of the light blocking portion may have a wave pattern formed by the convex portions and the concave portions.

The light blocking portion may be made of an opaque material.

Each of the convex portions may have a convex curved surface, and each of the concave portions may have a concave curved surface.

The convex portions and the concave portions may be alternately and repeatedly disposed, each of the convex portions may have a convex curved surface, and each of the concave portions may be a contact point of two adjacent convex portions among the convex portions.

The convex portions and the concave portions may be alternately and repeatedly disposed, and each of the concave portions may have a concave curved surface, and each of the convex portions may be a contact point of two adjacent concave portions among the concave portions.

The convex portions and the concave portions may be alternately and repeatedly disposed, and a virtual line connecting apexes of the convex portions or a virtual line connecting apexes of the concave portions may be a curved line.

The light blocking portion may include a first light blocking layer disposed on an edge of the incident surface where the incident surface is connected to the reflective surface; and a second light blocking layer disposed on an edge of the incident surface where the incident surface is connected to the emission surface.

A shape of the first light blocking layer may be different from a shape of the second light blocking layer.

The light blocking portion may include a first light blocking layer disposed on an edge of the emission surface where the emission surface is connected to the incident surface; and a second light blocking layer disposed on an edge of the emission surface where the emission surface is connected to the reflective surface.

A shape of the first light blocking layer may be different from a shape of the second light blocking layer.

In another general aspect, a reflection module includes a reflective member including an incident surface, a reflective surface, and an emission surface; and a holder on which the reflective member is mounted, wherein the reflective member further includes a light blocking portion disposed on either one or both of the incident surface and the emission surface and covering at least one portion of each of the either one or both of the incident surface and the emission surface, an end of the light blocking portion includes a plurality of convex portions and a plurality of concave portions, and the convex portions and the concave portions may be alternately and repeatedly disposed.

The light blocking portion may be disposed on any one or any combination of any two or more of a portion of the incident surface where the incident surface is connected to the reflective surface, a portion of the incident surface where the incident surface is connected to the emission surface, a portion of the emission surface where the emission surface is connected to the incident surface, and a portion of the emission surface where the emission surface is connected to the reflective surface.

The holder may include a cover portion covering opposite edges of the emission surface.

The holder may further includes a mounting surface on which the reflective member is mounted; a first sidewall surrounding a first side surface of the reflective member; and a second sidewall surrounding a second side surface of the reflective member, the cover portion may include a first cover portion extending from the first sidewall and covering one edge of the emission surface; and a second cover portion extending from the second sidewall and covering another edge of the emission surface, and the first cover portion and the second cover portion may extend toward each other.

The first cover portion may have a curved surface, the second cover portion may have a curved surface, and the curved surface of the first cover portion and the curved surface of the second cover portion may face each other.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
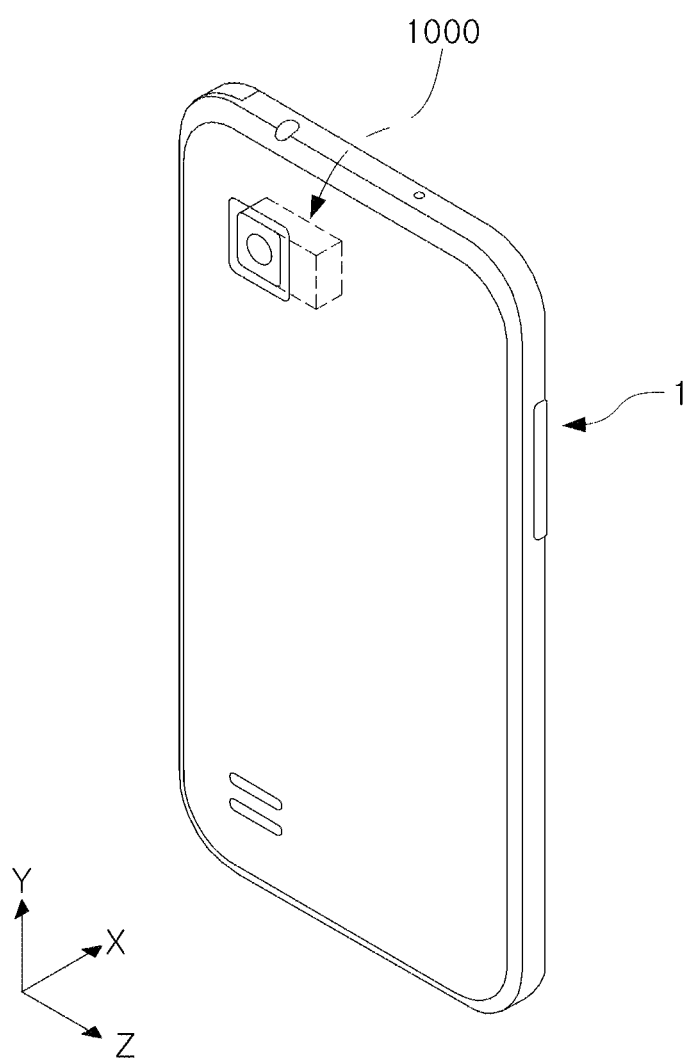
FIG. 1 is a perspective view of an example of a portable electronic device equipped with a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

FIG. 1 is a perspective view of an example of a portable electronic device equipped with a camera module.

Referring to FIG. 1, a camera module 1000 may be mounted in a portable electronic device 1. The portable electronic device 1 may be a portable electronic device such as a mobile communication terminal, a smartphone, or a tablet PC.

As illustrated in FIG. 1, the camera module 1000 is mounted in the portable electronic device 1 to image a subject.

In this example, the camera module 1000 includes a plurality of lenses. An optical axis (Z-axis) of the plurality of lenses may be oriented in a direction perpendicular to a thickness direction (X-axis direction, i.e., the direction from the front surface to the rear surface of the portable electronic device 1, or the opposite direction) of the portable electronic device 1.

For example, the optical axis (Z-axis) of the plurality of lenses provided in the camera module 1000 may be oriented in a width direction or a length direction of the portable electronic device 1.

Therefore, even when the camera module 1000 has functions such as autofocusing (hereinafter referred to as AF), optical zoom (hereinafter referred to as zoom), and optical image stabilization (hereinafter referred to as OIS), the portable electronic device 1 may be prevented from increasing in thickness. Accordingly, the thickness of the portable electronic device 1 may be reduced.

The camera module 1000 may have any one or any combination of any two or more of AF, zoom, and OIS functions.

The camera module 1000 having AF, zoom, and OIS functions is provided with various parts to implement these functions, and thus the size of the camera module 1000 increases compared to a camera module without these functions.

In the case in which the size of the camera module 1000 increases, it may be difficult to reduce the thickness of the portable electronic device 1 in which the camera module 1000 is mounted.

For example, the camera module includes a plurality of lens groups for the zoom function. When the plurality of lens groups are disposed in the thickness direction of the portable electronic device, the thickness of the portable electronic device increases according to the number of lens groups. Accordingly, if the thickness of the portable electronic device is not increased, a sufficient number of lens groups cannot be accommodated, resulting in poor zoom performance.

In addition, to implement the AF, zoom, and OIS functions, an actuator for moving a lens group in the optical axis direction or in a direction perpendicular to the optical axis is needed, and in a case in which the optical axis (Z-axis) of the lens group is oriented in the thickness direction of the portable electronic device, an actuator for moving the lens group needs to be installed in the thickness direction of the portable electronic device. Therefore, the thickness of the portable electronic device increases.

However, since the camera module 1000 is disposed in such a manner that the optical axis (Z-axis) of the plurality of lenses is perpendicular to the thickness direction (X-axis direction) of the portable electronic device 1, even when the camera module 1000 having the AF, zoom and OIS functions is mounted in the portable electronic device 1, the portable electronic device 1 may become thinner.

Figure 2:
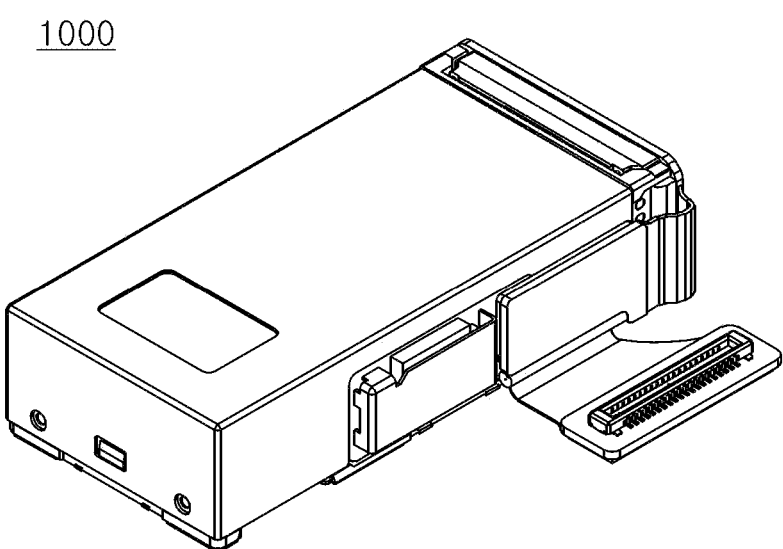
FIG. 2 is a schematic perspective view of an example of a camera module.
Figure 3:
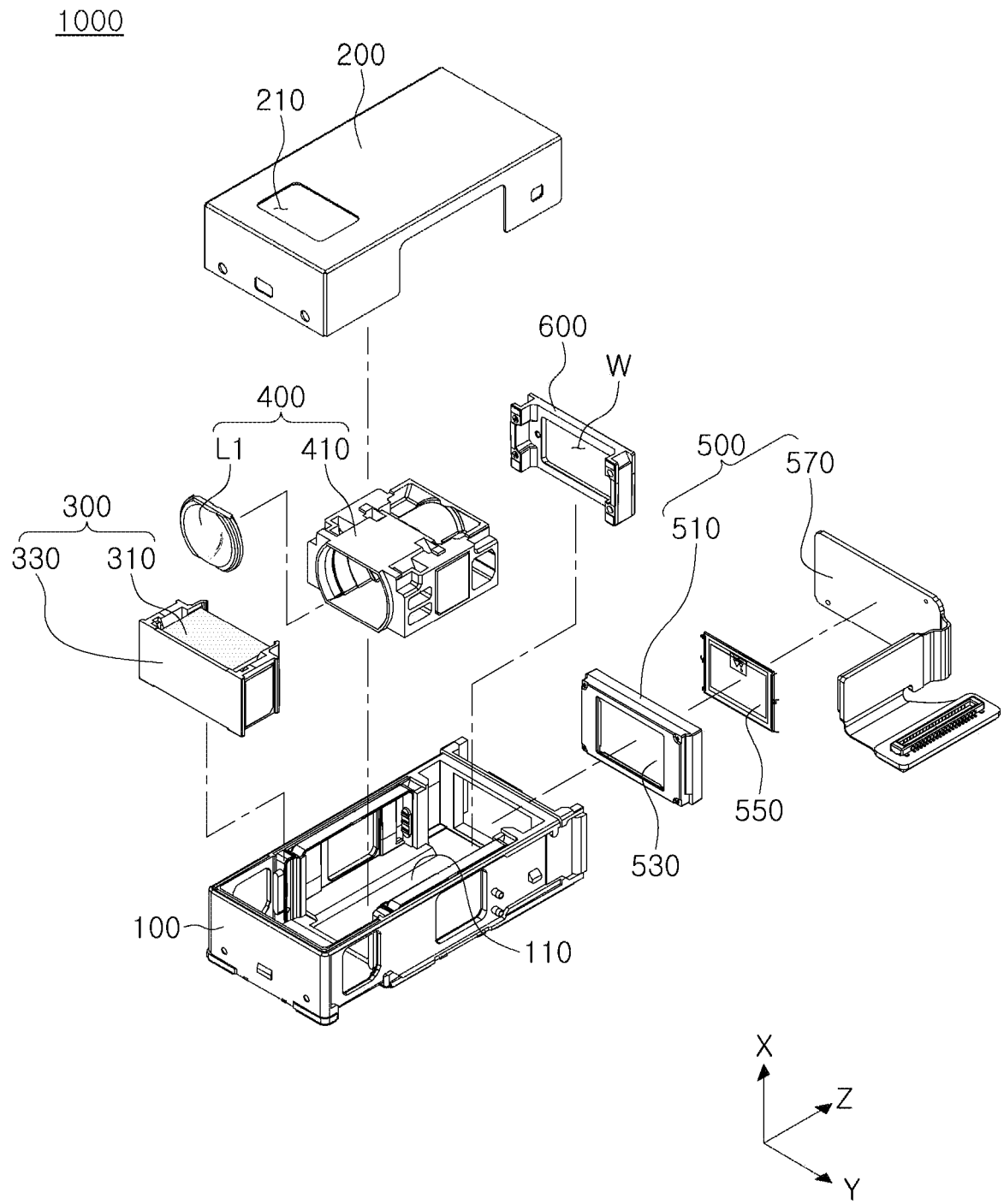
FIG. 3 is a schematic exploded perspective view of the camera module of FIG. 2.
Figure 4:
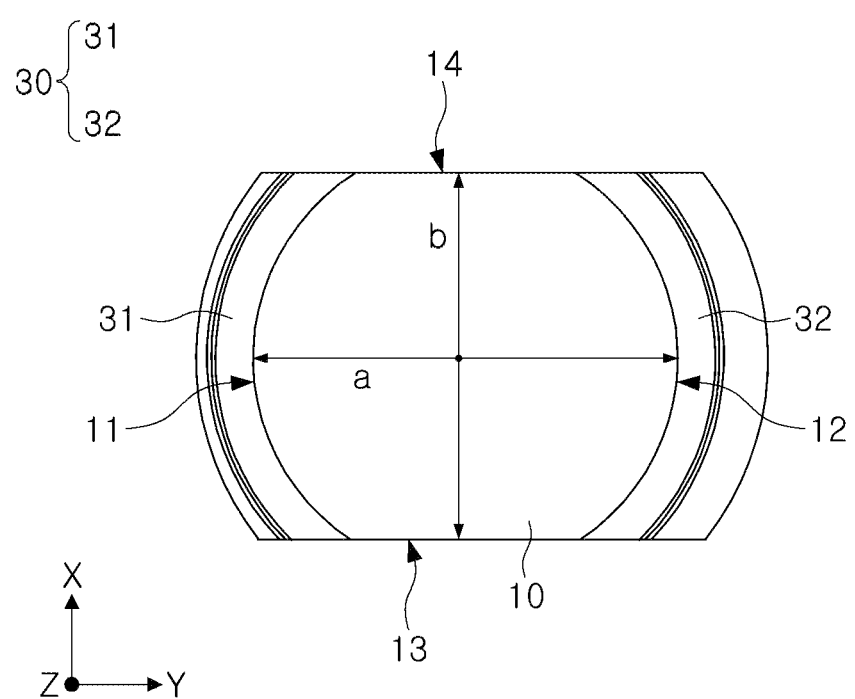
FIG. 4 is a plan view of a lens of the camera module of FIG. 3.

FIG. 2 is a schematic perspective view of an example of a camera module, FIG. 3 is a schematic exploded perspective view of the camera module of FIG. 2, and FIG. 4 is a plan view of a lens of the camera module of FIG. 3.

Referring to FIGS. 2 and 3, the camera module 1000 includes a housing 100, a reflection module 300, a lens module 400, an image sensor module 500, and a case 200.

The housing 100 may accommodate any one or any combination of any two or more of the reflection module 300, the lens module 400, and the image sensor module 500 therein. For example, the reflection module 300, the lens module 400, and the image sensor module 500 may be disposed in an internal space of the housing 100 from a first end of the housing 100 to a second end of the housing 100.

The housing 100 has an internal space to accommodate the reflection module 300, the lens module 400, and the image sensor module 500. Alternatively, the image sensor module 500 may be attached to an outer surface of the second end of the housing 100.

The housing 100 may have a box shape with an open top.

FIG. 3 illustrates an example in which the reflection module 300 is accommodated in the housing 100. Alternatively, the reflection module 300 may be disposed outside of the housing 100, and in this case, the first end of the housing 100 may be open to admit the light reflected from the reflection module 300. In addition, the reflection module 300 disposed outside of the housing 100 may be accommodated in a separate housing.

The case 200 is coupled to the housing 100 to cover the upper portion of the housing 100. The case 200 has an opening 210 through which light is incident. A traveling direction of the light incident through the opening 210 of the case 200 is changed by the reflection module 300 so that the light is incident on the lens module 400.

The reflection module 300 is configured to change a traveling direction of light. As an example, the traveling direction of light incident into the housing 100 may be changed to a direction toward the lens module 400 by the reflection module 300. The reflection module 300 is disposed in front of the lens module 400.

The reflection module 300 includes a reflective member 310 and a holder 330 in which the reflective member 310 is mounted.

The reflective member 310 is configured to change a traveling direction of light. For example, the reflective member 310 may be a mirror or a prism that reflects light.

The lens module 400 includes a plurality of lenses through which light passes after its traveling direction is changed by the reflective member 310, and a lens barrel 410 accommodating the plurality of lenses.

In FIG. 3, only first lens L1 disposed closest to the object side of the lens module 400 among the plurality of lenses of the lens module 400 is illustrated for convenience of description.

The image sensor module 500 includes a sensor housing 510, an infrared cut filter 530, an image sensor 550, and a printed circuit board 570.

The infrared cut filter 530 may be mounted in the sensor housing 510. The infrared cut filter 530 serves to block light in the infrared region in the light that has passed through the lens module 400.

The printed circuit board 570 is coupled to the sensor housing 510, and the image sensor 550 is mounted on the printed circuit board 570.

The light passing through the lens module 400 is received by the image sensor module 500 (e.g., the image sensor 550).

At least one of the plurality of lenses of the lens module 400 has a non-circular shape when viewed in the optical axis direction (Z-axis direction). For example, the first lens L1 has a non-circular shape when viewed in the optical axis direction (Z-axis direction). Alternatively, more than one lens or all of the plurality of lenses may have a non-circular shape when viewed in the optical axis direction (Z-axis direction).

Referring to FIG. 4, when viewed in the optical axis direction (Z-axis direction), the first lens L1 has a length in a first direction (X-axis direction) that is perpendicular to the optical axis direction (Z-axis) direction that is shorter than a length of the first lens L1 in a second direction (Y-axis direction) that is perpendicular to both the optical axis direction (Z-axis direction) and the first direction (X-axis direction).

For example, the first lens L1 has a major axis and a minor axis. A shortest line segment connecting opposite sides of the first lens L1 to each other in the first direction (X-axis direction) while passing through the optical axis (Z-axis) is a minor axis, and a shortest line segment connecting opposite sides of the first lens L1 to each other in the second direction (Y-axis direction) while passing through the optical axis (Z-axis) is a major axis. The major axis and the minor axis are perpendicular to each other, and the length of the major axis is longer than the length of the minor axis.

The first lens L1 includes an optical portion 10 and a flange portion 30.

The optical portion 10 is a portion of the first lens L1 exhibiting a lens characteristic of the first lens L1. For example, light reflected from a subject may be refracted while passing through the optical portion 10.

The optical portion 10 may have a positive refractive power or a negative refractive power, and may have two spherical surfaces, or one spherical surface and one aspherical surface, or two aspherical surfaces.

The flange portion 30 may be configured to mount the first lens L1 on another element, for example, the lens barrel 410 or another lens.

The flange portion 30 extends from the optical portion 10 and may be integrally formed with the optical portion 10.

The optical portion 10 has a non-circular shape when viewed in the optical axis direction (Z-axis direction). Referring to FIG. 4, when viewed in the optical axis direction (Z-axis direction), the optical portion 10 has a length in the first direction (X-axis direction) perpendicular to the optical axis direction (Z-axis direction) that is shorter than a length of the optical portion 10 in the second direction (Y-axis direction) perpendicular to both the optical axis direction (Z-axis direction) and the first direction (X-axis direction).

The optical portion 10 includes a first edge 11, a second edge 12, a third edge 13, and a fourth edge 14.

When viewed in the optical axis direction (Z-axis direction), the first edge 11 and the second edge 12 each have an arc shape.

The second edge 12 is on the opposite side of the optical portion 10 from the first edge 11 so that the first edge 11 and the second edge 12 face each other across the optical axis (Z-axis).

The fourth edge 14 is on the opposite side of the optical portion 10 from the third edge 13 so that the third edge 13 and the fourth edge 14 face each across the optical axis (Z-axis).

The third edge 13 and the fourth edge 14 connect the first edge 11 and the second edge 12 to each other. The third edge 13 and the fourth edge 14 are symmetrical about the optical axis (Z-axis) and are substantially parallel to each other.

When viewed in the optical axis direction (Z-axis direction), the first edge 11 and the second edge 12 have an arc shape, and the third edge 13 and the fourth edge 14 have a substantially straight shape.

The optical portion 10 has a major axis (a) and a minor axis (b). A shortest line segment connecting the third edge 13 and the fourth edge 14 to each other while passing through the optical axis (Z-axis) is the minor axis (b), and a shortest line segment connecting the first edge 11 and the second edge 12 to each other while passing through the optical axis (Z-axis), and perpendicular to the minor axis b, is the major axis (a). The length of the major axis (a) is longer than the length of the minor axis (b).

The flange portion 30 extends in the second direction (Y-axis direction) along a portion of a circumference of the optical portion 10. At least a portion of the flange portion 30 is in contact with an inner surface of the lens barrel 410.

The flange portion 30 includes a first flange portion 31 and a second flange portion 32. The first flange portion 31 extends from the first edge 11 of the optical portion 10, and the second flange portion 32 extends from the second edge 12 of the optical portion 10.

The first edge 11 of the optical portion 10 is a portion of the optical portion 10 adjacent to the first flange portion 31, and the second edge 12 of the optical portion 10 is a portion of the optical portion 10 adjacent to the second flange portion 32.

The third edge 13 of the optical portion 10 is a first side of the optical portion 10 on which the flange portion 30 is not formed, and the fourth edge 14 of the optical portion 10 is a second side of the optical portion 10 on which the flange portion 30 is not formed.

Referring to FIG. 3, the first lens L1 is disposed so that one of the sides of the first lens L1 disposed in the first direction (X-axis direction) faces a bottom surface 110 of the housing 100 and the sides of the first lens L1 disposed in the second direction (Y-axis direction) respectively face inner surfaces of sides of the housing 100. For example, the first lens L1 is disposed so that the sides of the first lens L1 disposed in the first direction (X-axis direction) are disposed in the thickness direction (X-axis direction) of the housing 100, and the sides of the first lens L1 disposed in the second direction (Y-axis direction) are disposed in the width direction (Y-axis direction) of the housing 100.

Since the length of the first lens L1 in the first direction (X-axis direction) is shorter than a length of the first lens L1 in the second direction (Y-axis direction), the thickness of the housing 100 may be reduced.

The camera module 1000 may further include a light shielding plate 600 disposed inside the housing 100.

For example, the light shielding plate 600 may be disposed in a space between the lens module 400 and the image sensor module 500.

The light shielding plate 600 includes a window W in the form of an opening through which light passes so that the light that has passed through the lens module 400 may enter the image sensor 550.

The light that has passed through the lens module 400 may be reflected by the inner surface of the housing 100 and/or the case 200, causing stray light to be incident on the image sensor 550. By disposing the light shielding plate 600 between the lens module 400 and the image sensor module 500, a flare phenomenon caused by such stray light may be effectively suppressed.

The surface of the light shielding plate 600 may be treated to scatter stray light.

The surface of the light shielding plate 600 may be treated to form a rough surface. For example, the surface of the light shielding plate 600 may be treated to be rougher than the surface of the housing 100.

For example, the surface of the light shielding plate 600 may be corroded to form a rough surface.

A light absorbing layer may be disposed on the surface of the light shielding plate 600 to block stray light. For example, the light absorbing layer may cause the surface of the light shielding plate 600 to have a lower reflectivity than the surface of the housing 100. The light absorbing layer may be black.

Figure 5:
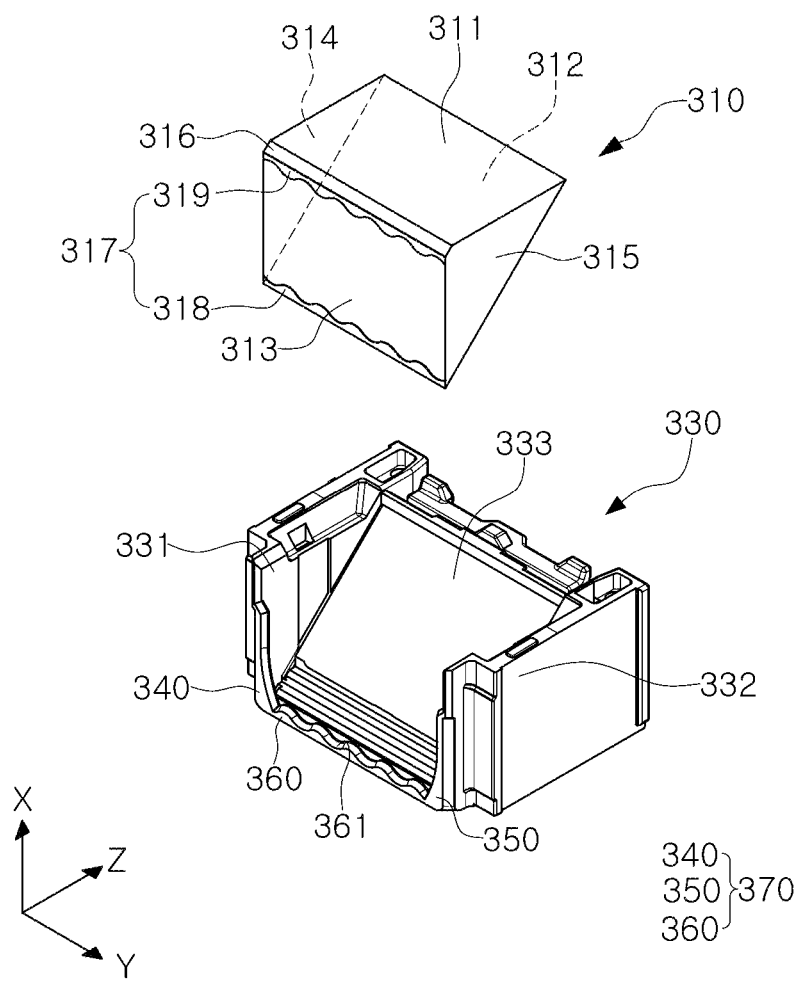
FIG. 5 is a schematic exploded perspective view of an example of a reflection module.
Figure 6:
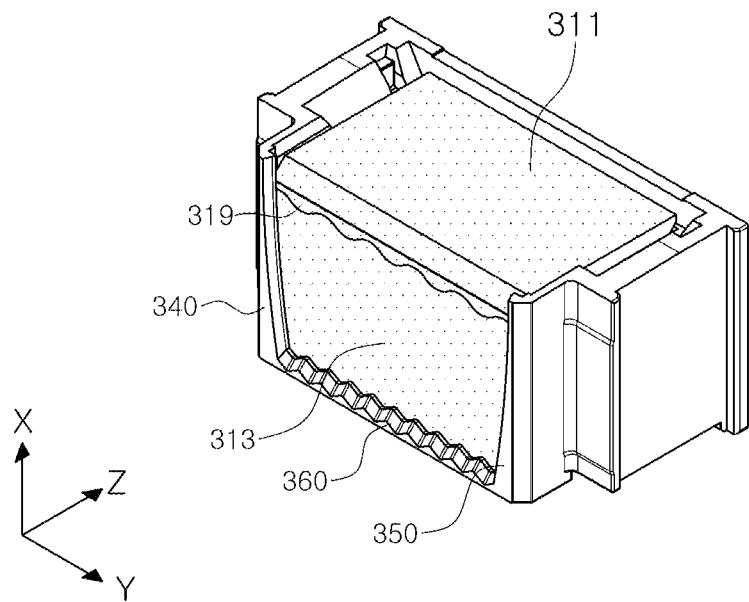
FIG. 6 is a schematic assembled perspective view of the reflection module of FIG. 5.
Figure 7:
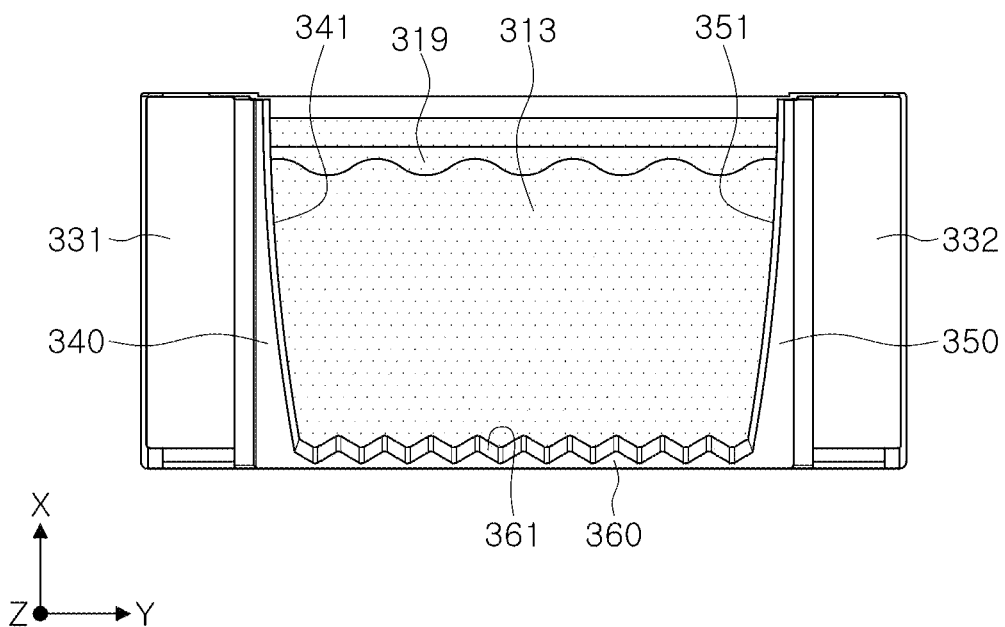
FIG. 7 is a schematic front view of the reflection module of FIG. 6.

FIG. 5 is a schematic exploded perspective view of an example of a reflection module, FIG. 6 is a schematic assembled perspective view of the reflection module of FIG. 5, and FIG. 7 is a schematic front view of the reflection module of FIG. 6.

Referring to FIGS. 5 to 7, the reflection module 300 includes the reflective member 310 and the holder 330 in which the reflective member 310 is mounted.

The reflective member 310 is configured to change the traveling direction of light incident on the reflective member 310. In this example, the reflective member 310 is a prism, but alternatively it may be a mirror.

The reflective member 310 has a shape obtained by dividing a rectangular cuboid or a cuboid in half along a diagonal of one face of the rectangular cuboid or the cuboid, and includes an incident surface 311, a reflective surface 312, and an emission surface 313. The incident surface 311 is a surface on which light is incident on the reflective member 310, the reflective surface 312 is a surface from which light is reflected, and the emission surface 313 is a surface from which light is emitted from the reflective member 310.

The reflective member 310 includes three quadrangular surfaces and two triangular surfaces. For example, the incident surface 311, the reflective surface 312, and the emission surface 313 of the reflective member 310 have a quadrangular shape, and a first side surface 314 and a second side surface 315 of the reflective member 310 have a substantially triangular shape.

Since the edge of the reflective member 310 connecting the incident surface 311 and the emission surface 313 to each other has a sharp shape, there is a risk of the edge being damaged by an impact. When the edge connecting the incident surface 311 and the emission surface 313 to each other is damaged by an impact, a flare phenomenon may be caused due to unintended reflection of light.

Accordingly, a chamfer 316 may be provided on the edge of the reflective member 310 connecting the incident surface 311 and the emission surface 313 to each other to prevent damage to the reflective member 310 due to an impact.

As an example, the chamfer 316 is formed to have a predetermined angle with respect to each of the incident surface 311 and the emission surface 313. The angle between the chamfer 316 and the incident surface 311 and the angle between the chamfer 316 and the emission surface 313 may each be an obtuse angle.

A light blocking layer may be provided on the chamfer 316. For example, the light blocking layer may be formed by attaching a shading film to the chamfer 316 or painting a shading paint thereon.

A light blocking portion 317 may be provided on the emission surface 313. The light blocking portion 317 may include a first light blocking layer 319 and a second light blocking layer 318 spaced apart from each other. The light blocking portion 317 will be described later with reference to FIGS. 8 to 14.

The holder 330 includes a first sidewall 331 and a second sidewall 332 surrounding both sides of the reflective member 310. The first sidewall 331 is disposed to surround the first side surface 314 of the reflective member 310, and the second sidewall 332 is disposed to surround the second side surface 315 of the reflective member 310.

In addition, the holder 330 includes a mounting surface 333 on which the reflective member 310 is mounted. The mounting surface 333 is disposed between the first sidewall 331 and the second sidewall 332, and the mounting surface 333 may be an inclined surface.

For example, the mounting surface 333 may be an inclined surface inclined by approximately 45° with respect to the optical axis (Z-axis) of the plurality of lenses. The reflective surface 312 of the reflective member 310 is coupled to the mounting surface 333 of the holder 330.

The light that has passed through the incident surface 311 is reflected from the reflective surface 312 and passes through the emission surface 313.

However, in a case in which light that has passed through the incident surface 311 is reflected from a portion of the reflective member 310 other than the reflective surface 312, for example, the first side surface 314 and the second side surface 315, a flare phenomenon may occur.

In addition, since not all of the light reflected from the reflective surface 312 is used for image formation, even in the case in which light is reflected only from the reflective surface 312, the light reflected from the reflective surface 312 not used for image formation may cause a flare phenomenon.

Therefore, in the camera module 1000, the holder 330 may cover a portion of the emission surface 313 of the reflective member 310, thereby preventing the occurrence of a flare phenomenon caused by stray light.

The holder 330 includes a cover portion 370 configured to cover a portion of the emission surface 313 of the reflective member 310. For example, the cover portion 370 may be configured to cover opposite side edges of the emission surface 313 of the reflective member 310.

The cover portion 370 includes a first cover portion 340 and a second cover portion 350.

The first cover portion 340 extends from the first sidewall 331 in a direction perpendicular to the optical axis (Z-axis) (for example, in the second axis direction (Y-axis direction)), and the second cover portion 350 extends from the second sidewall 332 in a direction perpendicular to the optical axis (Z-axis) (for example, in the second axis direction (Y-axis direction)). For example, the first cover portion 340 and the second cover portion 350 are disposed to extend toward each other.

The first cover portion 340 and the second cover portion 350 each cover a respective portion of the emission surface 313 of the reflective member 310. The first cover portion 340 may be configured to cover an edge of one side of the emission surface 313 of the reflective member 310, and the second cover portion 350 may be configured to cover an edge of the other side of the emission surface 313 of the reflective member 310.

As an example, the first cover portion 340 may be disposed to surround a portion of the emission surface 313 of the reflective member 310 that is connected to the first side surface 314 of the reflective member 310, and the second cover portion 350 may be disposed to surround a portion of the emission surface 313 of the reflective member 310 that is connected to the second side surface 315 of the reflective member 310.

The cover portion 370 may be configured so that a size of an area covering the emission surface 313 of the reflective member 310 increases toward the bottom surface 110 of the housing 100 (or toward the lower portion of the emission surface 313).

For example, the first cover portion 340 and the second cover portion 350 may each have a shape in which a size of an area covering the emission surface 313 of the reflective member 310 increases toward the bottom surface 110 of the housing 100.

The first cover portion 340 and the second cover portion 350 have surfaces 341 and 351 facing each other. The surfaces 341 and 351 are curved surfaces.

The surfaces 341 and 351 may be provided with an uneven portion or a light blocking layer to scatter light. As an example, the uneven portion may be a rough surface formed by corrosion treatment, and the light blocking layer may be formed by attaching a light blocking film to the surfaces 341 and 351 or painting a light blocking paint on the surfaces 341 and 351.

Stray light may be blocked by the first cover portion 340 and the second cover portion 350, and stray light may be scattered by the uneven portion provided on the surfaces 341 and 351, or stray light may be blocked by the light blocking layer, thereby suppressing a flare phenomenon.

The cover portion 370 may further include a third cover portion 360. The third cover portion 360 may be disposed to cover a portion of the emission surface 313 of the reflective member 310. For example, the third cover portion 360 may be disposed to surround a portion of the emission surface 313 of the reflective member 310 connected to the reflective surface 312 of the reflective member 310.

The third cover portion 360 is configured to connect the first cover portion 340 and the second cover portion 350 to each other, and may extend in a direction perpendicular to the optical axis (Z-axis) from the end of the mounting surface 333 of the holder 330 (for example, in a first direction (X-axis direction)).

The third cover portion 360 includes a plurality of protrusions 361. The plurality of protrusions 361 may be connected to each other to form a wave pattern. The plurality of protrusions 361 may be provided with an uneven portion or a light blocking layer to scatter light. For example, the uneven portion may be a rough surface formed by corrosion treatment, and the light blocking layer may be formed by attaching a light blocking film to the plurality of protrusions 361 or painting the plurality of protrusions 361 with a light blocking paint.

Since stray light may be blocked by the third cover portion 360 and stray light may be scattered by the plurality of protrusions 361 of the third cover portion 360, a flare phenomenon may be suppressed.

As described above, the camera module 1000 may include a light blocking structure constituted by the cover portion 370 of the holder 330 on which the reflective member 310 is mounted to prevent a flare phenomenon caused by stray light.

Figure 8:
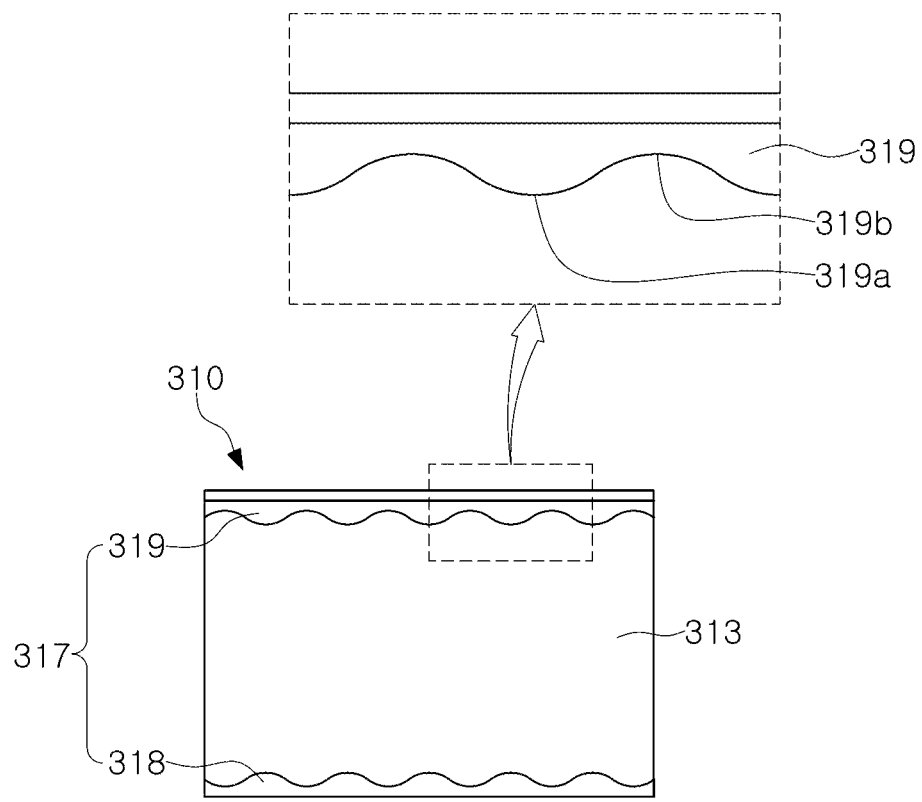
FIG. 8 is a front view of a reflective member of the reflection module of FIG. 5.

FIG. 8 is a front view of a reflective member of the reflection module of FIG. 5.

Even when the holder 330 on which the reflective member 310 is mounted includes a light blocking structure as described above, there is a concern that a flare phenomenon may occur due to stray light passing through the incident surface 311 of the reflective member 310 (for example, stray light passing through the edge of the incident surface 311) or stray light passing through the emission surface 313 (for example, stray light passing through the edge of the emission surface 313).

Accordingly, at least one of the incident surface 311 and the emission surface 313 of the reflective member 310 is provided with the light blocking portion 317. The light blocking portion 317 is configured to cover a portion of at least one of the incident surface 311 and the emission surface 313. The light blocking portion 317 may cover an edge of at least one of the incident surface 311 and the emission surface 313.

For example, the light blocking portion 317 may be disposed to cover at least one of a portion of the incident surface 311 where the incident surface 311 is connected to the reflective surface 312, a portion of the incident surface 311 where the incident surface 311 is connected to the emission surface 313, a portion of the emission surface 313 where the emission surface 313 is connected to the incident surface 311, and a portion of the emission surface 313 where the emission surface 313 is connected to the reflective surface 312.

Referring to FIG. 8, an example in which the light blocking portion 317 is disposed on the emission surface 313 of the reflective member 310 is illustrated.

The light blocking portion 317 includes at least one of the first light blocking layer 319 and the second light blocking layer 318. When the light blocking portion 317 includes both the first light blocking layer 319 and the second light blocking layer 318, the first light blocking layer 319 and the second light blocking layer 318 may be spaced apart from each other.

For example, the first light blocking layer 319 may be provided on a portion of the emission surface 313 adjacent to the incident surface 311, and the second light blocking layer 318 may be provided on a portion of the emission surface 313 adjacent to the reflective surface 312.

The first light blocking layer 319 may be disposed at a location where the emission surface 313 is connected to the incident surface 311, and the second light blocking layer 318 may be disposed at a location where the emission surface 313 is connected to the reflective surface 312.

For example, the first light blocking layer 319 may be provided on the upper edge of the emission surface 313, and the second light blocking layer 318 may be provided on the lower edge of the emission surface 313.

The first light blocking layer 319 and the second light blocking layer 318 may be made of an opaque material. The first light blocking layer 319 and the second light blocking layer 318 may be black.

The first light blocking layer 319 and the second light blocking layer 318 may be formed by attaching a light blocking film to the emission surface 313 or painting a light blocking paint thereon.

Since not all light passing through the emission surface 313 is used for image formation, a flare phenomenon may occur due to light not used for image formation. Accordingly, light not used for image formation may be blocked by providing the light blocking portion 317 on the emission surface 313.

However, even when light not used for image formation is blocked by the light blocking portion 317, light may be reflected from the end of the light blocking portion 317, which may cause a flare phenomenon to occur.

In this example, an end of the light blocking portion 317 may include a curved surface. For example, the end of the light blocking portion 317 may include a plurality of convex portions and a plurality of concave portions.

Ends of the first light blocking layer 319 and the second light blocking layer 318 may include curved surfaces. In this case, the ends are sides of the first light blocking layer 319 and the second light blocking layer 318 that face each other.

The distance between the first light blocking layer 319 and the second light blocking layer 318 may vary along the edges of the emission surface 313 (e.g., in the second axis direction (Y-axis direction)). For example, the distance between the first light blocking layer 319 and the second light blocking layer 318 may be repeatedly changed along the edges of the emission surface 313. Since the emission surface 313 has a rectangular shape, the distance between the first light blocking layer 319 and the second light blocking layer 318 may vary in the length direction of the emission surface 313.

Therefore, even in the case in which light is reflected from the end of the first light blocking layer 319 and/or the second light blocking layer 318, the reflected light may be scattered, thereby preventing a flare phenomenon.

Hereinafter, the first light blocking layer 319 will be described for convenience of description, and the second light blocking layer 318 may also have the same configuration as the first light blocking layer 319.

The end of the first light blocking layer 319 includes a plurality of convex portions 319a and a plurality of concave portions 319b. For example, the end of the first light blocking layer 319 may have a structure in which the convex portions 319a and the concave portions 319b are alternately and repeatedly disposed. The convex portion 319a and the concave portion 319b each have a curvature. For example, the convex portion 319a has a convex curved surface, and the concave portion 319b has a concave curved surface. The curvature of the convex portion 319a and the curvature of the concave portion 319b may be different from each other. For example, the curvature of the convex portion 319a may be less than the curvature of the concave portion 319b.

Accordingly, the end of the first light blocking layer 319 may have a wave pattern shape.

Light reflected from the convex portion 319a may be scattered. The light reflected from the concave portion 319b may be concentrated at an arbitrary point, but may pass through the arbitrary point and be scattered again.

Therefore, even in the case in which the light is reflected from the end of the first light blocking layer 319, the reflected light may be scattered, thereby preventing a flare phenomenon.

FIGS. 9 to 14 are diagrams illustrating modified examples of a light blocking portion of the reflective member of FIG. 8.

Figure 9:
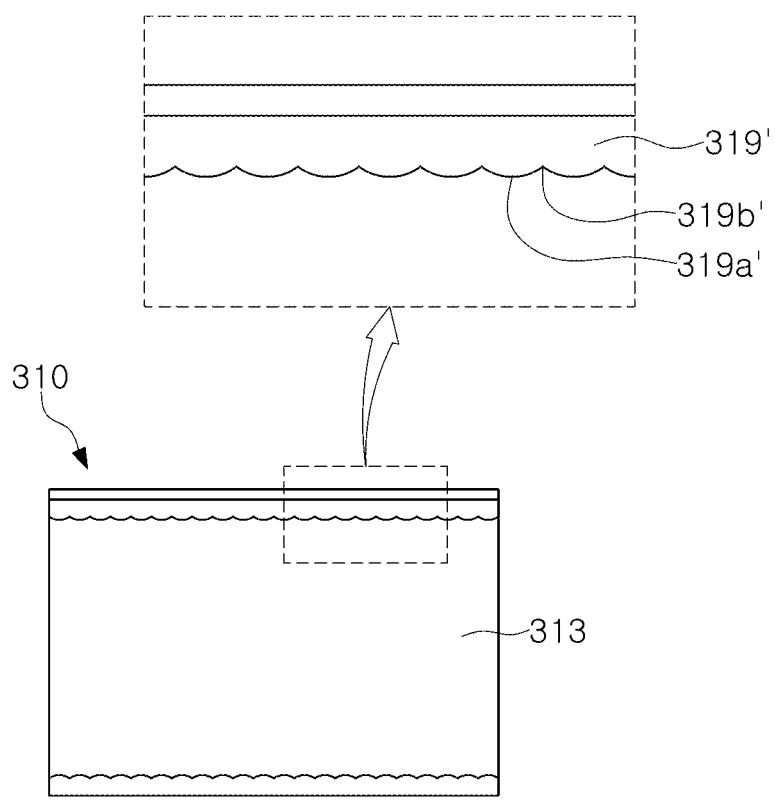
FIGS. 9 to 14 are diagrams illustrating modified examples of a light blocking portion of the reflective member of FIG. 8.

First, referring to FIG. 9, the end of a first light blocking layer 319' includes a plurality of convex portions 319a' and a plurality of concave portions 319b'. For example, the end of the first light blocking layer 319' may include a structure in which the convex portions 319a' and the concave portions 319b' are alternately and repeatedly formed.

Each of the plurality of convex portions 319a' has a curvature. For example, the plurality of convex portions 319a' each have a convex curved surface.

The plurality of convex portions 319a' contact each other, and a contact point may be formed between the convex portions 319a' adjacent to each other. A contact point formed between two adjacent convex portions 319a' may constitute the concave portion 319b'.

Figure 10:
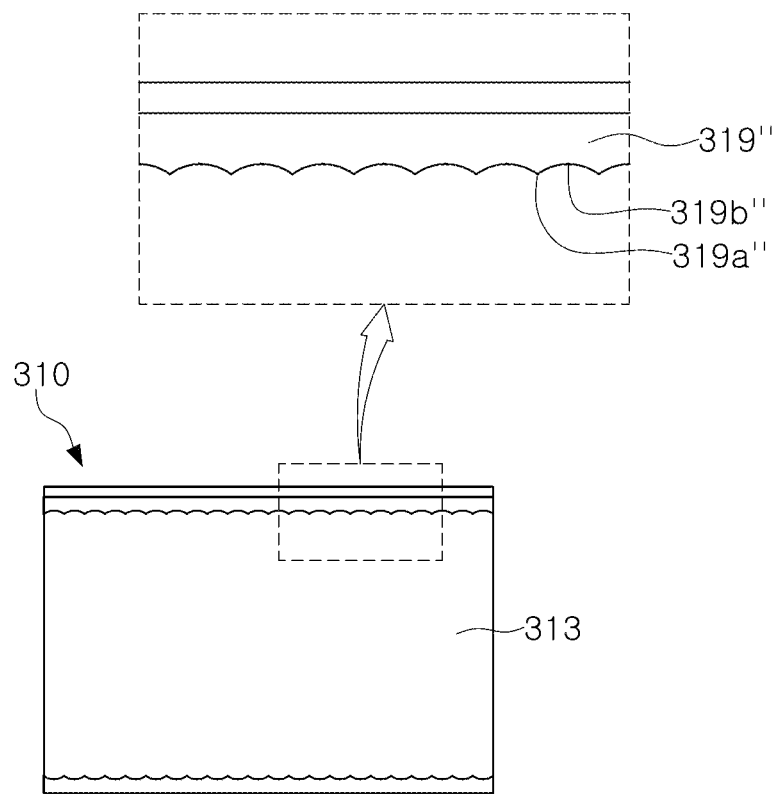

Referring to FIG. 10, an end of a first light blocking layer 319" includes a plurality of convex portions 319a" and a plurality of concave portions 319b". For example, an end of the first light blocking layer 319" may include a structure in which the convex portions 319a" and the concave portions 319b" are alternately and repeatedly formed.

Each of the plurality of concave portions 319b" has a curvature. For example, each of the plurality of concave portions 319b" has a concave curved surface.

The plurality of concave portions 319b" may contact each other, and a contact point may be formed between the concave portions 319b" adjacent to each other. A contact point formed between two adjacent concave portions 319b" may constitute the convex portion 319a".

Figure 11:
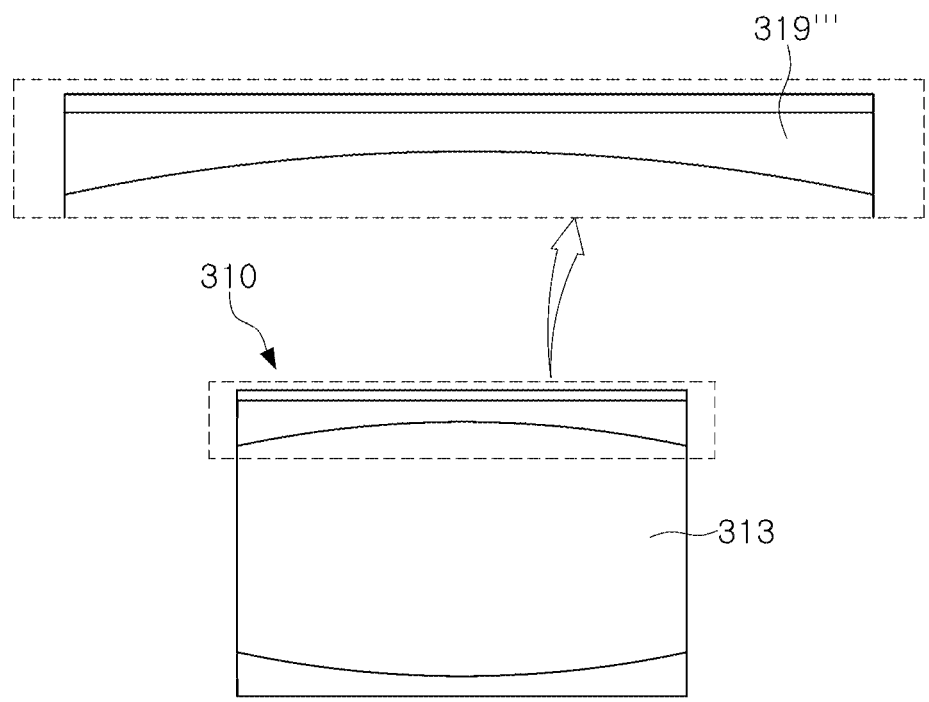

Referring to FIG. 11, an end of a first light blocking layer 319''' includes a curved surface. The end of the first light blocking layer 319''' has a curvature. For example, the end of the first light blocking layer 319''' includes a concave curved surface.

Figure 12:
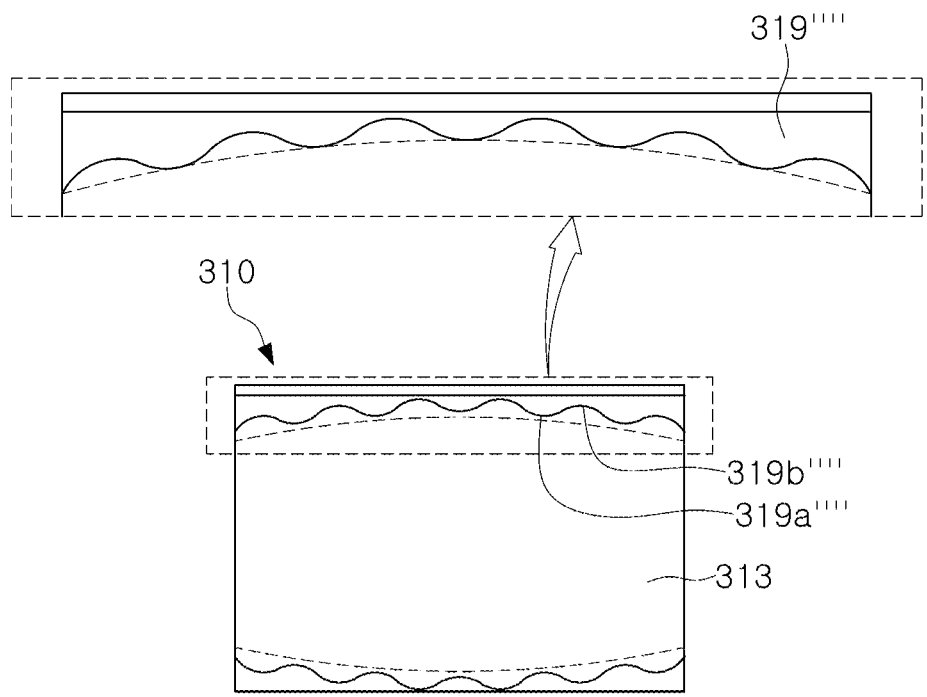

Referring to FIG. 12, the end of the first light blocking layer 319'''' includes a plurality of convex portions 319a'''' and a plurality of concave portions 319b''''. For example, the end of the first light blocking layer 319'''' may include a structure in which the convex portions 319a'''' and the concave portions 319b'''' are alternately and repeatedly formed.

The convex portion 319a'''' and the concave portion 319b'''' each have a curvature. For example, each of the plurality of convex portions 319a'''' has a convex curved surface, and each of the plurality of concave portions 319b'''' has a concave curved surface.

Accordingly, the end of the first light blocking layer 319'''' may have a wave pattern shape.

Distances between apexes of convex portions 319a'''' and the end of the first light blocking layer 319'''' may be different. Further, the distance between the apexes of the concave portions 319b'''' and the end of the first light blocking layer 319'''' may be different. The apex of the convex portion 319a'''' is a most convex portion of the convex portion 319a'''', and the apex of the concave portion 319b'''' is a most concave portion of the concave portion 319b''''. The end of the first light blocking layer 319'''' is a portion of the first light blocking layer 319'''' adjacent to the reflective surface 311.

A virtual line connecting the apexes of the convex portions 319a'''' or the concave portions 319b'''' may be a concave curve.

Figure 13:
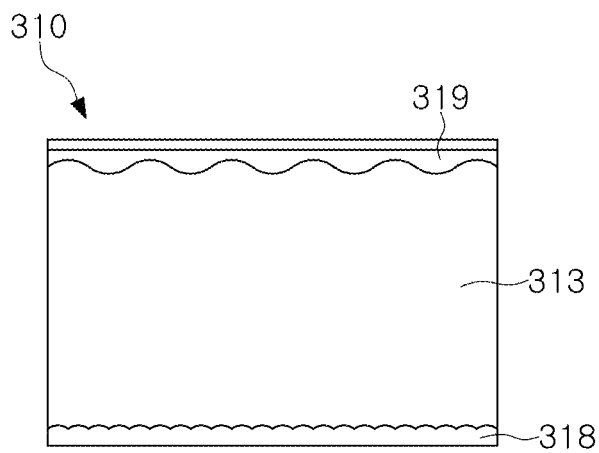

Referring to FIG. 13, the first light blocking layer 319 and the second light blocking layer 318 may have different shapes. For example, the first light blocking layer 319 may have any one shape of the examples of FIGS. 8 to 12, and the second light blocking layer 318 may have any other shape of the examples of FIGS. 8 to 12.

Figure 14:
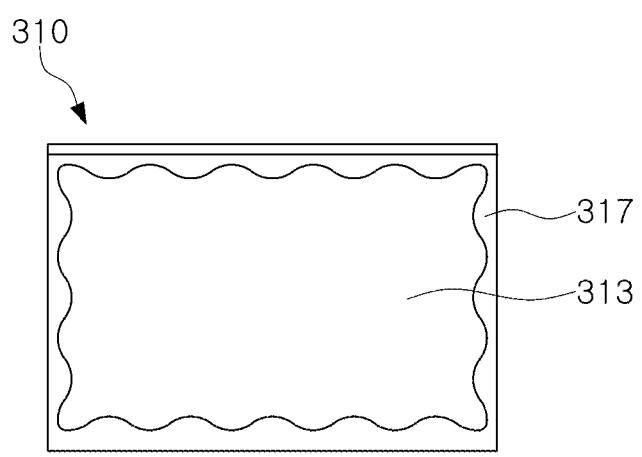

Referring to FIG. 14, the light blocking portion 317 may be continuously formed along the upper, lower, left, and right edges of the emission surface 313 of the reflective member 310. In this case, the end of the light blocking portion 317 may have at least one shape of the examples of FIGS. 8 to 12.

FIGS. 15 to 18 are schematic perspective views of other examples of the reflective member of FIG. 5.

Figure 15:
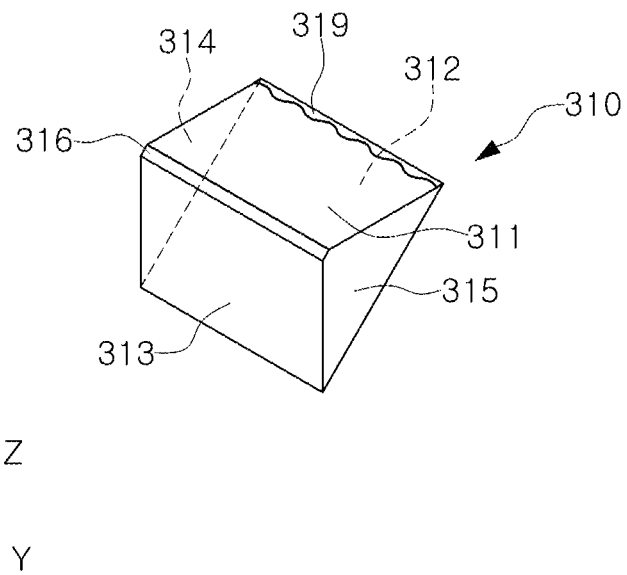
FIGS. 15 to 18 are schematic perspective views of other examples of the reflective member of FIG. 5.
Figure 16:
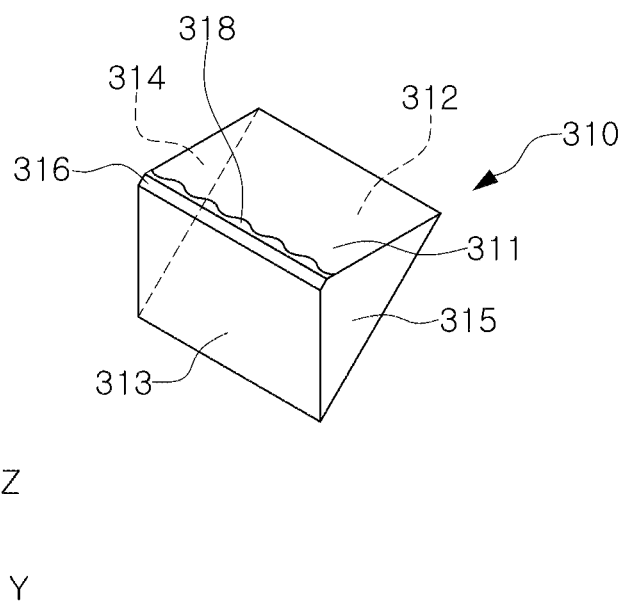
Figure 17:
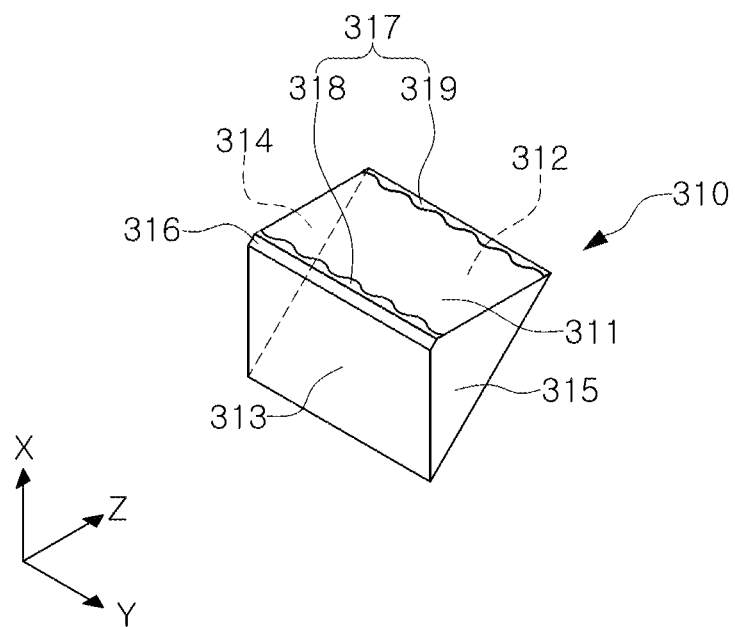

Referring to FIGS. 15 to 17, the light blocking portion 317 may be disposed on the incident surface 311 of the reflective member 310. The light blocking portion 317 may be disposed to cover a portion of the incident surface 311. For example, the light blocking portion 317 may be disposed to cover the edge of the incident surface 311.

The light blocking portion 317 includes at least one of the first light blocking layer 319 and the second light blocking layer 318. When the light blocking portion 317 includes both the first light blocking layer 319 and the second light blocking layer 318, the first light blocking layer 319 and the second light blocking layer 318 may be spaced apart from each other.

For example, the first light blocking layer 319 may be provided on a portion of the incident surface 311 adjacent to the reflective surface 312. The second light blocking layer 318 may be provided on a portion of the incident surface 311 adjacent to the emission surface 313.

The first light blocking layer 319 may be disposed in a location in which the incident surface 311 is connected to the reflective surface 312. The second light blocking layer 318 may be disposed in a location in which the incident surface 311 is connected to the emission surface 313.

The shape of the light blocking portion 317 may be any one of the examples of FIGS. 8 to 14.

Figure 18:
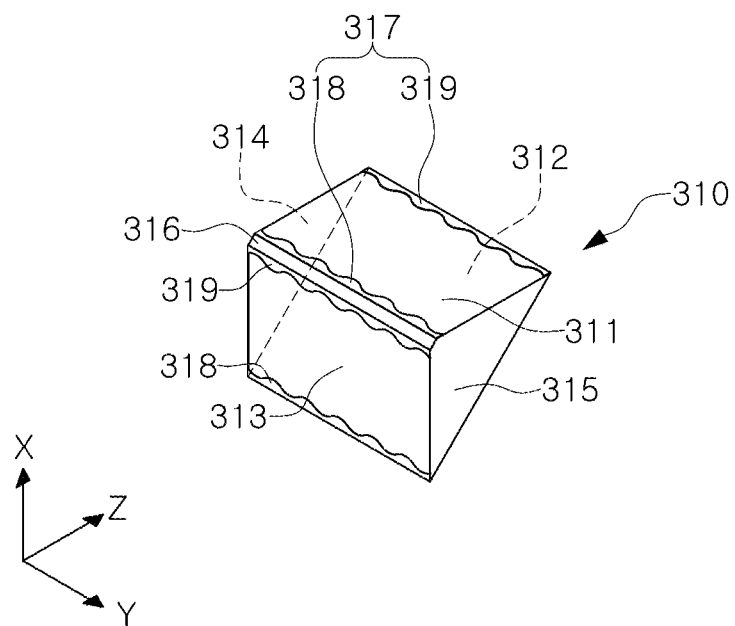

Referring to FIG. 18, the light blocking portion 317 may be disposed on the incident surface 311 and the emission surface 313 of the reflective member 310.

The light blocking portion 317 is configured to cover portions of the incident surface 311 and the emission surface 313. The light blocking portion 317 may cover edges of the incident surface 311 and the emission surface 313.

For example, the light blocking portion 317 may be disposed on a portion of the incident surface 311 where the incident surface 311 is connected to the reflective surface 312, a portion of the incident surface 311 where the incident surface 311 is connected to the emission surface 313, a portion of the emission surface 313 where the incident surface 313 is connected to the incident surface 311, and a portion of the emission surface 313 where the incident surface 313 is connected to the reflective surface 312.

The shape of the light blocking portion 317 may be any one of the examples of FIGS. 8 to 14.

The light blocking portion 317 disposed on the incident surface 311 and the light blocking portion 317 disposed on the emission surface 313 may have different shapes.

In the examples described above, a reflective member and a reflection module including the reflective module may prevent a flare phenomenon.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflective member comprising:
   an incident surface configured to receive incident light;
   a reflective surface configured to receive the incident light from the incident surface and reflect the incident light; and
   an emission surface configured to receive the reflected light from the reflective surface and emit the reflected light,
   wherein the emission surface comprises a light blocking portion comprising:
      a first light blocking layer disposed along an edge of the emission surface adjacent to the incident surface and comprising a curved surface; and
      a second light blocking layer disposed along an edge of the emission surface adjacent to the reflective surface and comprising a curved surface, and
   a shape of the first light blocking layer of the emission surface is different from a shape of the second light blocking layer of the emission surface.

2. The reflective member of claim 1, wherein each of the first light blocking layer of the emission surface and the second light blocking layer of the emission surface comprises a plurality of convex portions protruding toward a center of the emission surface, and a plurality of concave portions protruding toward an edge of the emission surface.

3. The reflective member of claim 2, wherein the convex portions and the concave portions are alternatively and repeatedly disposed along a longitudinal direction of each of the first light blocking layer of the emission surface and the second light blocking layer of the emission surface.

4. The reflective member of claim 3, wherein a virtual line connecting apexes of the convex portions is a curved line, or a virtual line connecting apexes of the concave portions is a curved line.

5. The reflective member of claim 2, wherein the convex portions and the concave portions are a curved surface, or a contact point of two adjacent convex portions among the convex portions or two adjacent concave portions among the concave portions.

6. The reflective member of claim 1, wherein the incident surface comprises a light blocking portion, and
   the light blocking portion of the incident surface comprises either one or both of:
      a first light blocking layer disposed along an edge of the incident surface adjacent to the reflective surface; and
      a second light blocking layer disposed along an edge of the incident surface adjacent to the emission surface.

7. The reflective member of claim 6, wherein the light blocking portion of the incident surface comprises both of the first light blocking layer of the incident surface and the second light blocking layer of the incident surface, and
   a shape of the first light blocking layer of the incident surface is different from a shape of the second light blocking layer of the incident surface.

8. A reflective module comprising:
   a reflective member comprising an incident surface, a reflective surface, and an emission surface; and
   a holder on which the reflective member is disposed,
   wherein the reflective member further comprises a light blocking portion disposed on the emission surface and comprising:
      a first light blocking layer disposed along an edge of the emission surface adjacent to the incident surface and comprising a curved surface; and
      a second light blocking layer disposed along an edge of the emission surface adjacent to the reflective surface and comprising a curved surface, and
   the holder comprises:

a first cover portion having a curved surface and covering one edge of the emission surface not covered by either one of the first light blocking layer and the second light blocking layer; and a second cover portion having a curved surface facing the curved surface of the first cover portion and covering another edge of the emission surface not covered by either one of the first light blocking layer and the second light blocking layer and opposite to the one edge of the emission surface covered by the first cover portion.

9. The reflective module of claim 8, wherein each of the first light blocking layer of the emission surface and the second light blocking layer of the emission surface comprises a plurality of convex portions protruding toward a center of the emission surface, and a plurality of concave portions protruding toward an edge of the emission surface.

10. The reflective module of claim 8, wherein the holder further comprises:

a mounting surface on which the reflective member is mounted;

a first sidewall surrounding a first side surface of the reflective member; and a second sidewall surrounding a second side surface of the reflective member, the first cover portion extends from the first sidewall toward the second sidewall and covers a first edge of the emission surface adjacent to the first sidewall; and the second cover portion extends from the second sidewall toward the first sidewall and covers a second edge of the emission surface adjacent to the second sidewall.

11. The reflective module of claim 8, wherein each of the first cover portion and the second cover portion has a width in a direction parallel to the edges of the emission surface along which the first light blocking layer of the emission surface and the second light blocking layer of the emission surface are disposed that changes in a direction perpendicular to the edges of the emission surface along which the first light blocking layer of the emission surface and the second light blocking layer of the emission surface are disposed.

* * * * *